United States Patent
Amborn et al.

(12) 
(10) Patent No.: US 6,364,780 B1
(45) Date of Patent: Apr. 2, 2002

(54) DRIVESHAFT

(75) Inventors: Peter Amborn, Neunkirchen-Seelscheid; Werner Dickhaut, Hanau; Wolfgang Lobel, Frankfurt, all of (DE)

(73) Assignee: GKN Lobro GmbH (DE)

( * ) Notice: Subject to any disclaimer, the term of this patent is extended or adjusted under 35 U.S.C. 154(b) by 0 days.

(21) Appl. No.: 09/564,768

(22) Filed: May 4, 2000

(30) Foreign Application Priority Data

May 7, 1999 (DE) .......................................... 199 21 228

(51) Int. Cl.[7] .............................. F16C 3/00; B21D 39/04
(52) U.S. Cl. ........................ 464/182; 228/131; 464/179
(58) Field of Search ................................ 464/113, 179, 464/181, 183, 134, 905, 112; 403/270, 271, 272; 228/131, 126

(56) References Cited

U.S. PATENT DOCUMENTS

| | | | |
|---|---|---|---|
| 1,291,388 A | * 1/1919 | Bright et al. | 464/181 |
| 3,898,418 A | * 8/1975 | Hasui | 219/121 P |
| 4,153,831 A | * 5/1979 | Renzulli et al. | 219/121 P |
| 4,336,436 A | * 6/1982 | Dubovetsky et al. | 219/61 |
| 4,352,975 A | * 10/1982 | Oyamada et al. | 219/125.11 |
| 4,358,284 A | * 11/1982 | Federmann et al. | 464/181 |
| 4,421,497 A | * 12/1983 | Federmann et al. | 464/181 |
| 4,472,619 A | * 9/1984 | Ueda et al. | 219/76.15 |
| 4,542,280 A | * 9/1985 | Simons | 219/137 WM |
| 4,751,365 A | * 6/1988 | La Rocca et al. | 219/121 LD |
| 4,912,299 A | * 3/1990 | Oros et al. | 219/137 PS |
| 5,198,635 A | * 3/1993 | Dankov et al. | 219/121.46 |
| 5,234,378 A | * 8/1993 | Helgesen et al. | 464/180 |
| 5,318,374 A | * 6/1994 | Rumberger | 464/182 |
| 5,320,579 A | * 6/1994 | Hoffmann | 464/181 |
| 5,611,135 A | * 3/1997 | Breese | 464/134 |
| 5,632,685 A | * 5/1997 | Myers | 464/183 |
| 5,637,042 A | * 6/1997 | Breese | 464/183 |
| 5,643,093 A | * 7/1997 | Breese | 464/183 |
| 5,672,186 A | * 9/1997 | Seeds | 219/137 PS |
| 5,868,626 A | * 2/1999 | Whitney | 464/134 |
| 5,914,058 A | * 6/1999 | Sanders et al. | 219/121.45 |
| 5,981,921 A | * 11/1999 | Yablochnikov | 29/603 |
| 6,001,018 A | * 12/1999 | Breese | 464/183 |
| 6,102,807 A | * 8/2000 | Barret et al. | 464/180 |

FOREIGN PATENT DOCUMENTS

| | | |
|---|---|---|
| DE | 35 09 306 A1 | 3/1985 |
| DE | 35 10 091 C2 | 3/1985 |
| DE | 44 37 398 C2 | 10/1994 |
| DE | 196 11 000 A1 | 3/1996 |

* cited by examiner

Primary Examiner—Lynne H. Browne
Assistant Examiner—Kenn Thompson

(57) ABSTRACT

The invention relates to a driveshaft and to a method of producing the driveshaft having three components a first attaching element 1 and a second attaching element 13 and a tube element 8 arranged therebetween. The tube element 8 is provided with a first end face 9 and a second end face 12. Both attaching elements 1, 13 comprise cylindrical receiving faces 4, 16 whose diameter is smaller than that of the tube bore 10 of the tube element 8. This permits a radial adjustment of the elements relative to one another with reference to a longitudinal reference axis 25 in order to keep any out-of-balance minimized. In the axial direction, close tolerances can be observed in that a first reference face 6 of the first attaching element 1 is set relative to the first end face 9 of the tube element at a fixed distance 7. The total nominal length 21 is achieved by introducing the second attaching element 13 by means of its cylindrical receiving face 16 more or less deeply into the tube element 8 between the first reference face 6 and a reference face 20 of the second attaching element, utilizing the compensating tolerance 18. The connections are produced by plasma welding.

8 Claims, 4 Drawing Sheets

DRIVESHAFT

BACKGROUND OF THE INVENTION

The invention relates to a driveshaft comprising three components, i.e., a first attaching element, a second attaching element and a tube element arranged therebetween. Furthermore, the invention relates to a method of producing such a driveshaft.

When producing driveshafts, especially those used in propeller shafts for drives in motor vehicles, the attaching elements are provided with seat faces which, in a centered way, are received in the tube bore of the tube element. The connection between the tube element and the attaching element is effected welding. Furthermore, it is known to provide each of the attaching elements with a cylindrical projection whose diameter is substantially adapted to the tube diameter, and to connect the tube element to the attaching elements by friction welding. In the case of both design solutions, the offset results in out-of-balance at the finish-produced driveshafts. This is also the case if the connection is effected by magnetic arc welding, because both welding technologies, i.e. friction welding and magnetic arc welding, require axial pressure for producing the connection. Under such pressure, the tube element at the attaching element slides out of the central position in the radial direction and, in the connected condition it is usually positioned eccentrically. In particular, this applies to thin-walled tubes.

In the case of connections where there is provided a centering seat and where, in the region of the seat face at the attaching element, there is provided a V-weld formed by an end face of the tube element and a shoulder of the attaching element, with the positioning of the tube element and the attaching element in the axial direction being predetermined in a defined way, there occur considerable deviations in length if the tube elements are not accurately produced to a specific length. This means that it is necessary to develop complicated and expensive methods for machining the tubes. In addition, it is necessary to take into account the axial run-out which, even if its value is acceptable from a production-technical point of view, leads to an inclined position of the attaching elements in the tube element, which is not permissible.

SUMMARY

It is therefore an object of the invention to propose a driveshaft and a method of producing a driveshaft, for which purpose there is required a simple, cost-effective production process which permits an accurate connection even of thin-walled tubes comprising good concentric running characteristics and small length tolerances.

In accordance with the invention, the foregoing and other objects are achieved by providing a driveshaft comprising three components each having an individual longitudinal axis: a first attaching element, a second attaching element, and a straight tube element which is arranged therebetween. The straight tube element has a first end face and a second end face and a tube bore. The two attaching elements each comprise a cylindrical receiving face, which cylindrical receiving faces, starting from the two end faces, are arranged at least along part of their axial length in the tube bore. Furthermore, the tube bore has a greater diameter than the receiving faces. The individual components, by means of their individual longitudinal axes, are aligned radially, independently of one another, on a longitudinal reference axis and connected by welds which are located between the end faces of the tube element and the associated receiving faces. The first end face of the tube element, which first end face faces the first attaching element, is arranged at a predetermined distance from a first reference face or a first reference axis of the first attaching element. The total nominal length is determined by the distance between the first reference face or the first reference axis and a second reference face or a second reference axis of the second attaching element.

Furthermore, said objective is achieved by providing a method of producing a driveshaft from a first attaching element, a second attaching element and a tube element which each comprise an individual longitudinal axis and which are connected to one another by welds. The attaching elements each comprise a cylindrical receiving face and the tube element comprises a cylindrical tube bore as well as a first end face and a second end face. The receiving faces are produced with a diameter which, relative to the diameter of the tube bore, permits a predetermined maximum radial relative adjustment. Furthermore, the first attaching element, the second attaching element and the tube element, by means of their individual longitudinal axes, are axially aligned to one another and are radially aligned on a longitudinal reference axis and thereafter connected by producing a weld between the first receiving face and the first end face and between the second receiving face and the second end face.

The two solutions in accordance with the invention achieve a driveshaft with minimized out-of-balance characteristics. The present driveshaft, even at high speeds, features quiet running characteristics and can be produced with small construction tolerances. As compared to the tube bore of the tube element, the diameter of the receiving faces of the attaching elements is smaller such that, in cases of limited tolerances, there is not yet any line contact between the receiving face and the tube bore, thus permitting a radial displacement of the parts relative to one another until the individual longitudinal axes of the parts are concentrically aligned on the longitudinal reference axis. It is possible to achieve a driveshaft with reduced out-of-balance because the reference axis is determined by the receiving points of a device for the attaching elements and the tube element.

A further advantage of the present invention is that any construction tolerances of the individual components affecting the total nominal length do not exert any special influence. In particular, it is possible to produce the lengths of tube by simple production methods such as sawing or cutting. Tolerances regarding the overall length are compensated for by introducing the second attaching face of the second attaching element into the tube bore more or less deeply. As the weld is produced between the respective end face of the tube element and the associated attaching face of one of the attaching elements, any length tolerances or any axial run-out do not adversely affect the connection or the dimensional accuracy of the driveshaft in the radial or axial direction. The axial alignment of the individual longitudinal axes of the components can take place simultaneously with, or after, the radial alignment of the components by means of their individual longitudinal axes relative to the longitudinal reference axis, but such alignment has to take place prior to the welding operation.

The welds are preferably produced by plasma welding. Such a welding method is particularly suitable for bridging larger gap widths. Furthermore, it is possible, first, to carry out only one alignment and fixing operation of the first attaching element relative to the tube element, i.e. the radial alignment relative to a longitudinal reference axis. The first end face of the tube element is thus axially aligned, which first end face faces the attaching element, relative to a predetermined distance from a first reference face or reference axis of the first attaching element. The two parts can then be connected to one another by a weld. Subsequently, the second attaching element is radially aligned relative to the tube element by using the longitudinal reference axis and additionally effecting an axial setting to the total nominal length by effecting an alignment to the predetermined second distance between the first reference face or first reference axis and a second reference face or second reference axis of the second attaching element. The parts are subsequently connected to one another by a weld.

However, in a preferred embodiment, the connection and alignment of both end faces of both attaching elements are effected simultaneously. This also applies to producing the two welds. To accelerate the process, it is also possible to produce the two welds between the end faces and the associated attaching faces by circumferentially distributed welding guns. The welds for connecting the first receiving face to the first end face and the second receiving face to the second end face can be produced simultaneously. It is advantageous to use a more advanced plasma welding method which is characterized by a reliable welding start, a higher welding speed and reduced distortion. There occurs no spatter, so that there is no need for any subsequent treatment. Such a method is known, for example, under the name of "Plasma Braze Process" developed by ARC KINETICS (38 The Fairway, Daventry, Northants, NN11 4NW, England).

Other objects and advantages will become apparent upon reading the following detailed description and appended claims, and upon reference to the accompanying drawings.

BRIEF DESCRIPTION OF THE DRAWINGS

Preferred embodiments and the process sequence are described in greater detail with reference to the drawings wherein.

DETAILED DESCRIPTION OF THE INVENTION

Figure 1:
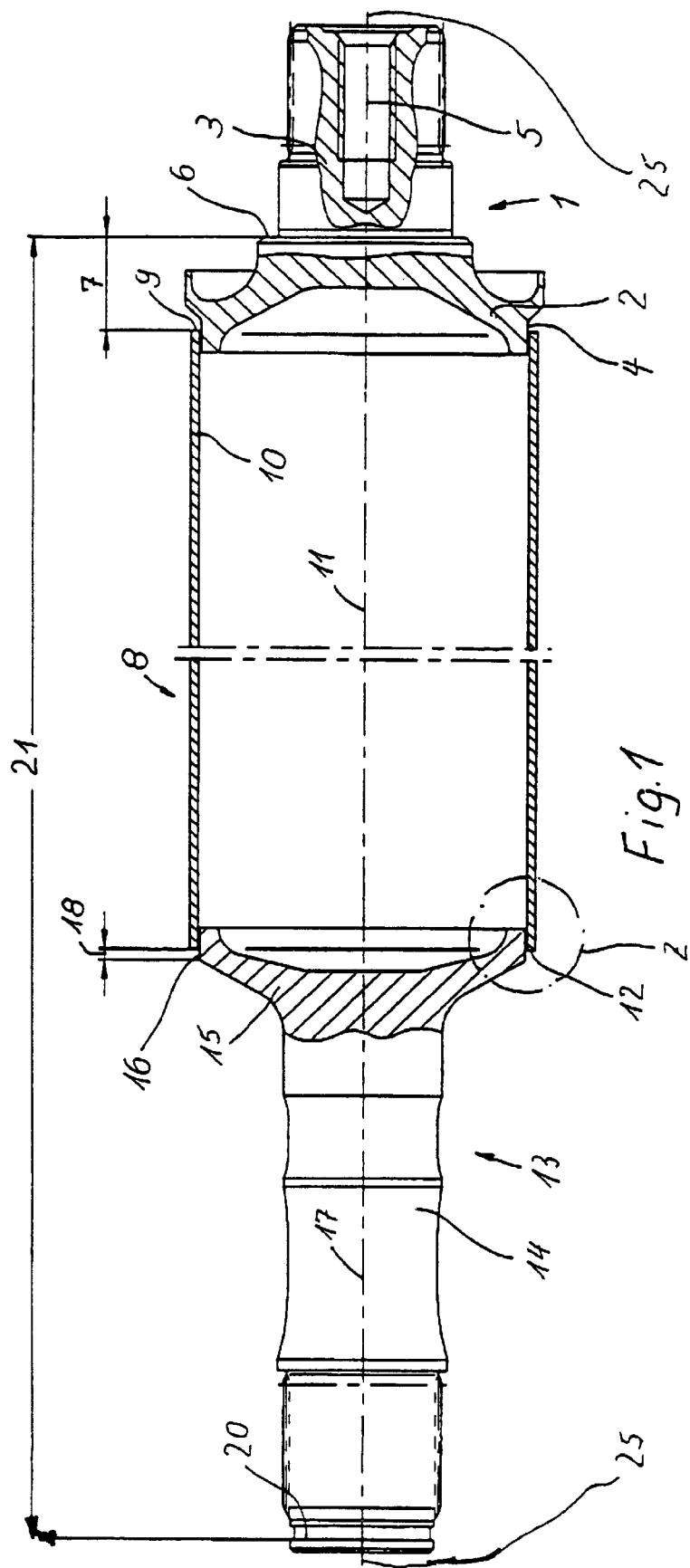
FIG. 1 is a longitudinal section through a first embodiment of the invention, detailing the way in which the components of the drive shaft are associated with one another prior to being connected.

FIG. 1 is a longitudinal section through a first embodiment of the invention, detailing the way in which the components of the driveshaft are associated with one another prior to being connected. The driveshaft comprises a first attaching element 1, a second attaching element 13 and a tube element 8 connecting the two attaching elements 1, 13. The first attaching element 1 comprises a flange portion 2 which is larger than the journal portion 3; both can have individual longitudinal axes. For the sake of simplicity, the first longitudinal axis of both has been given the reference number 5. Furthermore, the flange portion 2 is associated with the first receiving face 4 which is cylindrical in shape.

The individual longitudinal axes 5, 17, 11 of the first attaching element 1, of the second attaching element 13 or of the tube element 8 are meant to be the longitudinal axes which result from machining operations carried out on the individual portions of the components. Only one of these axes is aligned relative to the longitudinal reference axis 25 by being received in a tensioning device during the connecting operation in connection with the errors of the tensioning device which is produced more accurately than the components. Any deviation of the longitudinal axes of the individual portions within a component, which deviation may occur for example between the face serving as the tensioning face and the receiving face of the of the attaching element, is compensated for in connection with the radial play relative to the tube bore.

A shoulder between the journal portion 3 and the flange portion 2 forms a first reference face 6. In the region of its first end face 9, the tube element 8, by means of its tube bore 10, extends over the cylindrical receiving face 4 of the first attaching element 1, with the diameter of the tube bore 10 being greater than the diameter of the cylindrical receiving face 4. The tube element 8 comprises the longitudinal axis 11. As a result of the diameter dimensions of the tube bore 10 and of the cylindrical attaching face 4, there is permitted a mutual radial alignment of same relative to one another within certain limits for the purpose of aligning the longitudinal axes 5, 11 of the tube bore 10 and of the cylindrical attaching face 4 relative to a longitudinal reference axis 25, which can be achieved by positioning same in suitable holding means or receiving devices. For this purpose, the longitudinal axis of one of the components associated with the driveshaft can constitute the longitudinal reference axis.

Furthermore, the tube element 8 is aligned relative to the first attaching element 1 in the axial direction in such a way that the end face 9 is set to a predetermined distance 7 from the first reference face 6.

The second end face 12 of the tube element 8, which end face points to the second attaching element 13, is also provided with a journal portion 14 and a flange portion 15 whose outside is provided with a continuous cylindrical second receiving face 16. The longitudinal axis of the second attaching element 13 has been given the reference number 17. A delimiting face of a groove at the end of the journal portion 14 constitutes a second reference face 20. By means of its end face at the flange end and thus also by means of the second receiving face 16, the second attaching element 13 extends into the tube bore 10. There remains a free portion of the second receiving face 16 in front of the second end face 12 of the tube element 8. This free portion can be used as a compensating tolerance 18 in order to set the unit to the total nominal length 21 between the first reference face 6 of the first attaching element 1 and the second reference face 20 of the second attaching element 13.

Figure 2:
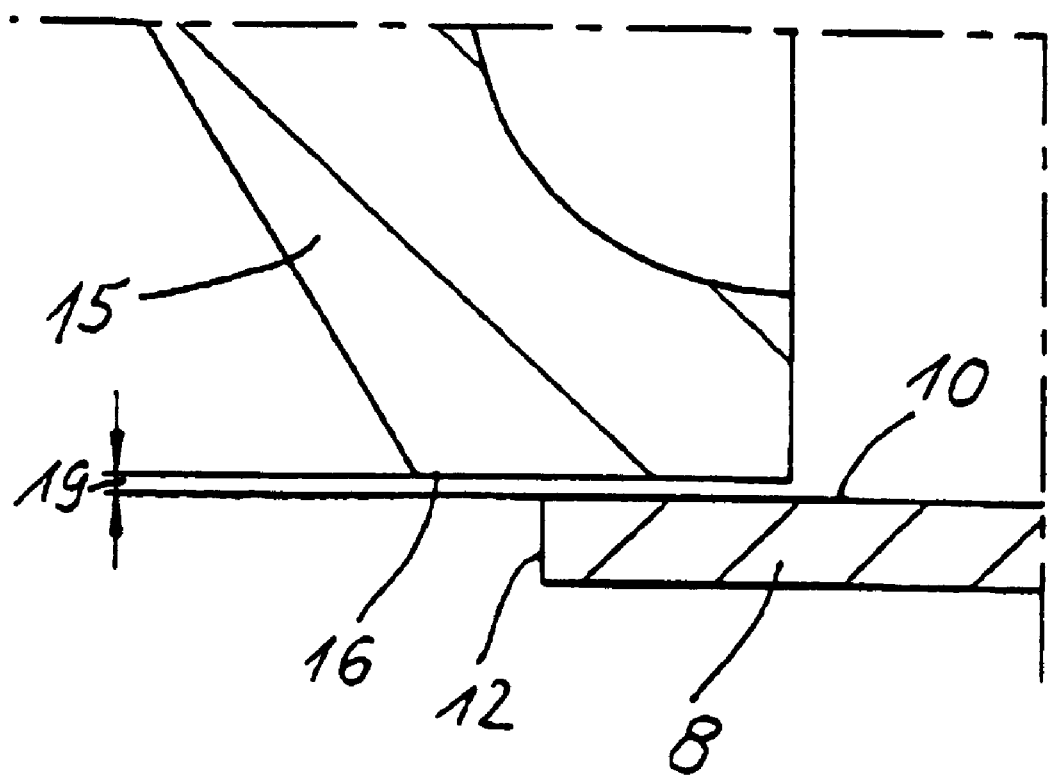
FIG. 2 shows the detail Z according to FIG. 1.

Furthermore, as in the case of the first attaching element 1, a radial adjustment is possible towards the tube element 8, which is particularly obvious from FIG. 2.

FIG. 2 shows the gap 19 which can be used in the radial direction for adjusting the respective attaching element relative to the tube bore 10. It is used for radially aligning the second attaching element 13 by means of its longitudinal axis 17 relative to the tube element 8 with the help of the longitudinal reference axis 25, as shown in FIG. 2. Because the total nominal length 21 is determined by the distance between the reference faces 6 and 20 at the attaching elements 1, 13, any deviations in length or axial run-out of the tube element 8 do not have any special effect on the dimensional accuracy of the driveshaft in respect of its length. Any slight out-of-balance is kept to a minimum as a result of the radial alignment of the individual longitudinal axes 5, 11, 17 of the components relative to the longitudinal reference axis 25.

Figure 3:
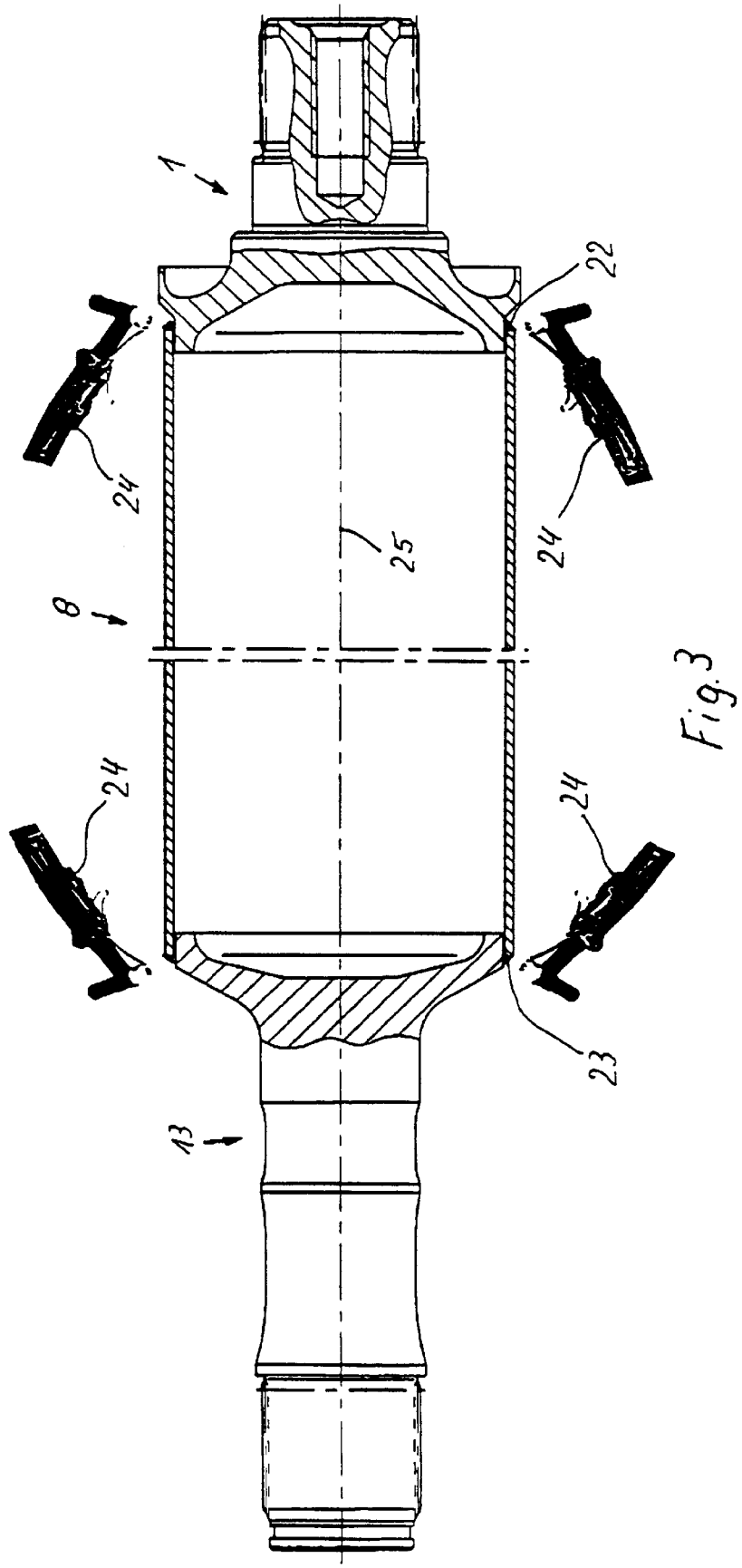
FIG. 3 shows the parts aligned relative to one another during the welding operation.

Thus, overall, there is achieved a driveshaft with very quiet running characteristics and a good dimensional accuracy if, in accordance with FIG. 3, the components aligned in the above way are connected by welds 22, 23 produced by the welding guns 24 as illustrated, with the welding process being plasma welding.

Figure 4:
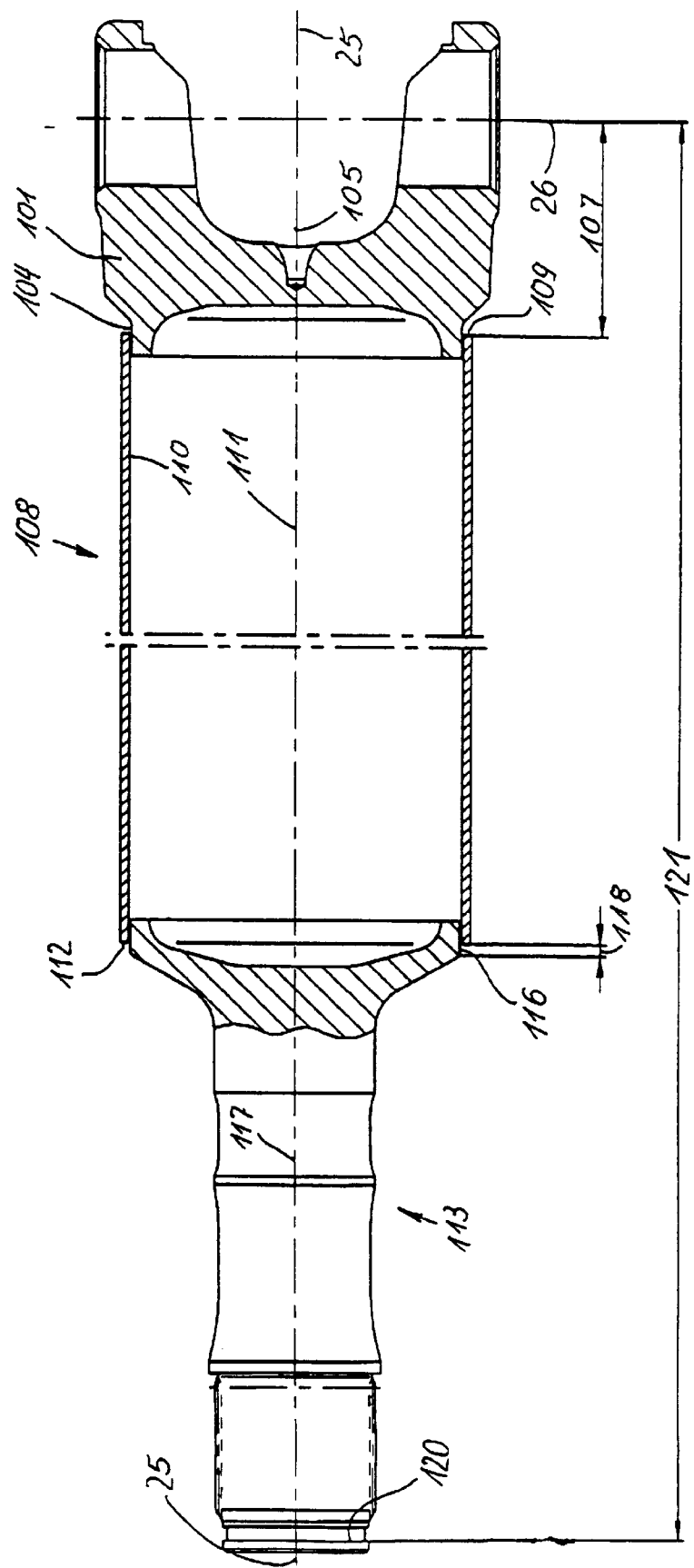
FIG. 4 shows a further embodiment of a driveshaft before the welding operation takes place.

FIG. 4 shows an embodiment of a driveshaft which is modified as compared to FIG. 1, with any components and functional dimensions which are identical to those of FIG. 1 being given reference numbers which are increased by 100 as compared to those of FIG. 1. Therefore, as far as the description of FIG. 4 is concerned, reference is also made to the description of FIG. 1. FIG. 4 differs from FIG. 1 in that the first attaching element 101 is provided in the form of a yoke of a universal joint. FIG. 4 shows the eye bores in the yoke for receiving the bearing bushes of two arms of a cross member, which arms are arranged on the reference axis 26. The first attaching element 101 comprises the individual first longitudinal axis 105 and the first cylindrical receiving face 104 at its end facing the end face 109 of the tube element 108. In accordance with the embodiment according to FIG. 1, the receiving faces 104, 116 have a smaller diameter than the tube bore 110. Again, the individual longitudinal axis 111 of the tube element 108 is held so as to be aligned on the longitudinal reference axis in that the tube element 108 is received in a tensioning element (not illustrated). The second attaching element 113, in respect of its design, corresponds to the second attaching element 13 according to FIG. 1. As regards the conditions between the cylindrical receiving face 116 and the tube bore 110 and the compensating tolerance 118 between the end of the second receiving face 116 and the end face 112, reference is made to the descriptions of FIGS. 1 and 2. Again, because the second attaching element 113 is received in a device, its individual longitudinal axis 17 is aligned relative to the longitudinal reference axis 25, with said second attaching element 113 being aligned in the axial direction in such a way that the second reference face 120 is set relative to the reference axis 26 to a total nominal length represented by the distance 121. The connections between the attaching elements 101, 113 and the tube element 108 are produced as described in connection with FIGS. 1 to 3.

From the foregoing it can be seen that there has been brought to the art a new and improved driveshaft. While the invention has been described in connection with one or more embodiments, it should be understood that the invention is not limited to these embodiments. On the contrary, the invention covers all alternatives, modifications and equivalents, as may be included in the spirit and scope of the appended claims.

What is claimed is:

1. A driveshaft comprising a first attaching element (1, 101), a second attaching element (13, 113) and a tube element (8, 108) which is arranged therebetween each of said elements having a longitudinal axis (5, 105; 11, 111; 17, 117) said tube element having a first end face (9, 109) a second end face (12, 112) and a tube bore (10, 110), wherein the two attaching elements (1, 101; 13, 113) each comprise a cylindrical receiving face (4, 104; 16, 116), which cylindrical receiving faces, starting from the two end faces (9, 109; 12, 112), are arranged at least along part of their axial length in the tube bore (10, 110), wherein, furthermore, the tube bore (10, 110) has a greater diameter than the receiving faces (4, 104; 16, 116) and wherein said elements, by way of their individual longitudinal axes (5,105; 11, 111; 17,117), are aligned radially, independently of one another, on a longitudinal reference axis (25) and connected by welds (22, 23) which are located between the end faces (9, 109; 12, 112) of the tube element (8, 108) and the associated receiving faces (4, 104; 16, 116), wherein the first end face (9, 109) of the tube element (8, 108), which first end face (9, 109) faces the first attaching element (1, 101), is arranged at a predetermined distance (7, 107) from a first reference face (6) of the first attaching element (1, 101) and that the total nominal length is determined by a distance (21, 121) between the first reference face (6) and a second reference face (20, 120) of the second attaching element (13, 113).

2. The driveshaft of claim 1 wherein the first end face (9, 109) of the tube element (8, 108) is arranged at a predetermined distance (7, 107) from a first reference axis (26) of the first attaching element (1, 101) and that the total nominal length is determined by a distance (21, 121) between the first reference axis (26) and a second reference face (20,120) of the second attaching element (13, 113).

3. The driveshaft of claim 1 wherein the first end face (9, 109) of the tube element (8, 108) is arranged at a predetermined distance (7, 107) from a first reference axis (26) of the first attaching element (1, 101) and that the total nominal length is determined by a distance (21, 121) between the first reference axis (26) and a second reference axis of the second attaching element (13, 113).

4. A method of producing a driveshaft comprising a first attaching element (1, 101), a second attaching element (13, 113) and a tube element (8, 108) which each comprise an individual longitudinal axis (5, 105; 11, 111; 17, 117) and which are connected to one an-other by a weld (22, 23), and wherein the attaching elements (1, 101; 13, 113) each comprise a cylindrical receiving face (4, 104; 16, 116) and the tube element (8, 108) comprises a cylindrical tube bore (10, 110) as well as a first end face (9, 109) and a second end face (12, 112), wherein, furthermore, the receiving faces (4, 104; 16, 116) are produced with a diameter which, relative to the diameter of the tube bore (10, 110), permits a predetermined maximum radial relative adjustment, wherein, furthermore, the first attaching element (1, 101), the second attaching element (13, 113) and the tube element (8, 108) are axially aligned to one another and, by way of their individual longitudinal axes (5, 105; 11, 111; 17, 117), are radially aligned on a longitudinal reference axis (25) and thereafter connected by producing a weld (22, 23) between the first receiving face (4, 104) and the first end face (9, 109) and between the second receiving face (16, 116) and the second end face (12, 112).

5. A method according to claim 4, wherein the axial alignment process takes place after, or simultaneously with, the radial alignment process, wherein, first, the first end face (9, 109) and a first reference face (6) or a first reference axis (26) of the first attaching element (1, 101) are axially set relative to one another at a predetermined distance (7, 107) from one another, and wherein, thereafter, the second attaching element (13, 113) by means of a second reference face (20, 120) or a second reference axis, is axially set relative to the first reference face (6) or the first reference axis (26) at a predetermined distance (21, 121) from one another.

6. A method according to claim 4, wherein the welds (22, 23) are produced by plasma welding.

7. A method according to claim 6, wherein the welds are produced so as to be distributed around the circumference of the end faces (9, 109; 12, 112), starting simultaneously in several places and from there taking an arched course, following the end faces (9, 109; 12, 112) and the receiving faces (4, 104; 16, 116).

8. A method according to claim 6, wherein the welds (22, 23) for connecting the first receiving face (4, 104) to the first end face (9, 109) and for connecting the second receiving face (16, 116) to the second end face (12, 112) are produced simultaneously.

* * * * *